2,719,119

INHIBITING DEGRADATION OF QUEBRACHO DRILLING FLUIDS

Charles F. Teichmann, Crestwood, N. Y., and Allen D. Garrison, Houston, Tex., assignors to Texaco Development Corporation, New York, N. Y., a corporation of Delaware No Drawing. Application April 2, 1952,
Serial No. 280,193

16 Claims. (Cl. 252—8.5)

The present invention relates to the subsurface drilling of wells or bore holes through underground formations and particularly to the drilling fluids or muds employed in such drilling operations.

More specifically the invention concerns drilling operations involving the continuous circulation of such drilling fluids or muds downwardly through the drill stem, to and about the bit of a rotary drilling rig and thence upwardly between the drill stem and the walls of the bore hole for the purpose of tapping underground reservoirs of oil, gas, brine, or water. In this operation, the drilling fluid serves to lubricate the drill stem and the bit, to transport the cuttings to the surface, to seal and hold in place the traversed walls of the bore hole, to impose a hydrostatic head upon the formation preventing the escape of high pressure fluids into the bore hole, and to perform numerous other functions.

The present invention is specifically applicable to such operations employing a water base drilling fluid or mud which, in addition to the usual suspension of clay, weighting agent and other typical mud constituent, depends upon small additions of a plant tannin extract such as quebracho for the purpose of controlling mud properties. The tannins, which term is meant to include the alkaline reaction products which result from addition of the extract to an alkaline mud, function as thinners to control the viscosity and thixotropy of the mud and are believed to act through a dispersive effect upon the mud gel structure which is reflected in a modification of mud viscosity. Also, the plant tannin derivatives exert another important effect in decreasing the fluid loss which occurs as the result of mud filtration along the wall of the bore hole. In addition, they tend to increase the strength and toughness of the filter cake thus formed on the walls of the bore hole.

As above intimated, the plant tannins are effective in relatively small proportions, as for example 0.5-5.0 pounds per barrel of mud, which, however, depends upon the specific mud to be treated, and is critical from the standpoint that their employment in excess, known as "overloading," may be detrimental.

In accordance with the present invention, the effective mud modifying properties of the plant tannin herein referred to as its "dispersive effect" or "dispersive properties" are protected against deterioration in the drilling fluid by the presence of suspended, finely divided, solid particles of an elemental metal having a substantial reducing power in aqueous, alkaline solutions, such as are found in drilling muds. Powdered metallic zinc or aluminum are particularly contemplated since the metals are relatively soft and do not wear or erode equipment in the drilling mud circuit. In addition, they react slowly in alkaline solutions, typical of ordinary drilling muds with the liberation of hydrogen in an active state.

Additional metals also having a suitable reducing effect are iron, magnesium, calcium, and barium. Iron, however, lacks the softness of the zinc or aluminum particles, and must not contain substantial proportions of alloying constituents which inhibit its reducing power in the presence of an aqueous, alkaline medium. Therefore, iron-containing, substantial quantities of silica, phosphorus, nickel, and/or chromium are to be avoided, although iron particles having substantial susceptibility to oxidation are effective to overcome deterioration of the tannins.

Powdered metallic magnesium, calcium and barium likewise exhibit substantial reducing capacity and, accordingly, have a good protective effect, but are difficult to handle in dry, finely divided, solid particle condition. Advantageously, therefore, the magnesium, calcium and barium may be employed in the form of an alloy with some convenient diluent metal such as tin, lead or with one of the other metals such as aluminum or zinc, above mentioned. The reducing power of the active metal is thereby desirably moderated and the hazard of handling the metal in dry, powdered form, during the mud compounding is obviated.

From the foregoing, it is also apparent that suspended metallic particles desirably present relatively clean, reactive surfaces accessible to the oxidizing influences of the mud fluid. Therefore, it is particularly contemplated employing a powder, the particles of which are essentially free of any protective surface coating effective to impair the activity or reducing power of said surfaces or to prevent contact of the metal surfaces with the mud fluids.

The present invention follows from the discovery that in solution in a typical drilling fluid, particularly in the presence of caustic or other alkaline material, the tannin dispersant, such as quebracho, undergoes a progressive deterioration presumably due to oxidation, such as by oxygen from air, with an accompanying loss of dispersive properties. The present invention is concerned with overcoming or inhibiting this deterioration.

More specifically, solutions of quebracho have been found to decrease in mud modifying effectiveness upon contact with air, ultimately becoming relatively ineffective from the standpoint of mud viscosity modification, suppression of fluid loss and the other desired characteristics herein referred to as dispersive properties.

For example, a simulated caustic-quebracho mud treating solution comprising 10 gms. of quebracho extract and 5 gms. caustic soda per 100 ml. of water was tested for oxygen absorbing rate in a Burrell gas analyzer and then repeatedly retested after aeration for successive periods extending over approximately three weeks. In the initial absorption test the freshly prepared solution completely absorbed the test volume of oxygen in approximately 40 passes. However, after 24 hours aeration, only about 3% of the test volume of oxygen was absorbed in 60 passes through the solution, and after three weeks of further aeration, the oxygen absorbing capacity of the solution was further decreased. These results indicate, therefore, a progressive absorption of oxygen by the caustic-quebracho solution approaching an ultimate condition of saturation.

To determine the effect of oxygen absorption upon the properties of the plant tannin dispersant, one portion of the above treating solution was stored in a sealed, airtight, container, whereas a second portion was placed in a gas absorption container and subjected to aeration by a flow of air at the rate of 0.7 to 1.0 cubic feet per hour per 100 ml. of solution. After 16 days of aeration the sample was made up to the original volume with water and tested, in comparison with the first portion of treating solution, as an additive to a P-95 drilling mud. The results of these tests demonstrate a profound reduction in the dispersive effect of the aerated quebracho solution. For example, in the filtration tests, the aerated caustic-quebracho, in all cases, caused an actual increase in the rate of water-loss by the standard A. P. I. filtration test indicating an essentially complete destruction of the water loss modifying properties of the quebracho.

The deflocculating power of the aerated caustic-quebracho solution likewise evidenced substantial impairment. For example, the following table lists the modification in viscosity of the mud treated respectively with the aerated and non-aerated solutions:

| Caustic-Quebracho Treating Solution | Quebracho, lb./bbl. mud | Percent Change of Stormer Viscosity at 600 R. P. M. |
| --- | --- | --- |
| Aerated | 1.75 | −9.3 |
| Do | 3.50 | −5.8 |
| Non-aerated | 1.75 | −42.2 |
| Do | 3.50 | −56.8 |

Manifestly, therefore, the dispersive effect of the tannin component is seriously impaired by aeration in aqueous solution, particularly in the presence of caustic.

In accordance with the present invention, it has been discovered that the foregoing deterioration of the tannin dispersant and of its mud improving properties which occurs in aqueous media such as drilling muds or treating fluids is overcome or inhibited by the presence of the foregoing solid particle, elemental metals dispersed throughout the mud. Accordingly, the drilling fluid maintains its desired properties over long periods of time.

The primary advantage of the present invention, therefore, resides in maintaining the dispersant properties of the vegetable tannin products added to the mud by overcoming the normal, progressive oxidative deterioration which otherwise occurs. As a result, the overall amount of tannin extract required for mud formulation and maintenance is greatly minimized so that the expense of mud treatment is accordingly decreased.

This advantage is enhanced by the fact that only relatively small amounts of the powdered metal are effective in the aqueous fluid to substantially, completely overcome the deterioration of the tannin. Such concentrations are in the order of 0.005 to about 0.2 pound per barrel of mud. Actually substantial protection of the tannin additive is realized in the presence of even lower amounts of the powdered protective agent, being appreciable in amounts ordinarily considered to be mere traces, as for example, as low as 0.001 pound per barrel of drilling fluid.

On the other hand, somewhat increased proportions of the powdered metal up to as high as one pound per barrel are advantageous from the standpoint that they provide a substantial reservoir of excess reducing material effective to protect against deterioration of the tannin material over long periods of time, and thus decreasing the frequency of the treatment periods required for make-up or replenishment of the protective agent.

The suspended protective agent in the case of zinc and aluminum particles has the particular advantage that it does not, in the small quantities added, tend to flocculate the suspended particles, or in any other way materially alter the desired character of the mud.

As above intimated, it is contemplated periodically replenishing the suspended metallic powder to maintain the desired concentration in the mud. Such replenishment must, of course, be made to allow for mud loss and mud contamination which may occur during drilling, as well as consumption of the metallic particles which slowly occurs as the result of oxidation and other reactions during the drilling operation. Therefore, where the relatively small concentrations in the order of 0.005 to 0.2 pound per barrel are continuously maintained, a more frequent replenishment is necessary than where larger proportions up to about one pound of suspended metal powder per barrel of mud is employed. Advantageously, the smaller concentrations are selected in the case of the metallic magnesium, calcium or barium to avoid adverse effect on the mud, as evidenced by a tendency toward flocculation of the clay particles.

Since the extent of mud contamination or loss, or the intensity of the prevailing deteriorating influences are not usually predictable in practice, it is preferable to maintain a current, effective concentration of protective agent in the mud. Alternatively, since the requirement for supplemental protective agent is reflected by deterioration in the dispersing properties of the tannin, supplemental additions of both the tannin dispersant and the protective agent may be made in response to, for example, a detectable increase in filtration rate of the mud, or an increase in mud viscosity.

In practice, the finely powdered metal may be added directly to a drilling fluid, uniform admixture and distribution being realized by means of a mud gun or other suitabel mixing means. In the usual clay-containing drilling fluid with typical gel-forming characteristics, maintenance of the solid, metallic particles in uniform suspension throughout the fluid, is ordinarily no problem. However, the use of a relatively, finely divided suspension of the metallic protective agent is advantageous from the standpoint of maintaining a substantial and effective reducing influence to insure substantially completely overcoming deterioration of the tannin. Therefore, particles finer than about 20 mesh are desired, preferably particles finer than about 60 mesh. Advantageously, the range of particle size may extend from about 60 to about 400 mesh or finer.

Since the capacity of the drilling fluid to maintain the particles in continuously uniform suspension is due largely to the aforementioned gel-forming characteristics of the fluid, where relatively low gelling rates and viscosities are encountered, it may also be advisable to employe the more finely divided particles in the foregoing ranges. As above indicated, the previously prepared powder may be admixed intimately into the drilling mud during its formulation. Subdivision of the metal to produce the fine powder may be carried out in the field by means of any suitable comminuting equipment, either prior to or following addition to the fluid. For example, metal particles may be introduced into a portion of the drilling mud and the mixture subjected to fine grinding in a ball or pebble mill to further reduce the particles to the desired state of subdivision. The ground slurry thus produced is then dispersed into the main body of the drilling fluid. In this manner large concentrations of the metallic suspension may be introduced into relatively small portions of the drilling fluid and thereafter distributed throughout the entire quantity of mud in the system to build up the desired overall concentration.

Obviously this agent is of particular advantage in field operations from the standpoint that the special precautions as regards rate and manner of addition to the drilling fluid. This is particularly so in the case of metallic aluminum or zinc, and follows from the fact that localized excesses in concentration which may occur during admixing do not cause "overloading," and, as above indicated, are in no way detrimental.

It is particularly important to note that aluminum and zinc, while normally characterized by the tendency towards surface passivity, are not thereby impaired as regards their protective effect upon the plant tannin dispersant materials. This, it is believed, results from the inherent nature of the typical drilling fluid containing, as it does, a high concentration of solid, suspended particles which pass through the well bore under conditions of relatively substantial turbulence and accordingly subject the surfaces of the active metal particles to continuous surface abrasion or scrubbing. It is this cleansing action by the mud particles which apparently tends to continuously maintain the surfaces of the protective agent in a state of high effectiveness and activity.

It is also contemplated maintaining high surface activity in the case of aluminum and zinc particles by amalgamating the surfaces thereof. To this end the aluminum and zinc powder, prior to addition to the drilling fluid, may be subjected to an amalgamation, as for example, immersion in a solution of mercuric chloride. Actually, in the case of relatively clean aluminum-zinc particles, contact with 1-2% of mercuric chloride for only a short period, as for example, one to five minutes, is adequate to form the required amalgamated surface. Thereafter the powder is immediately dispersed and admixed throughout the mud, forming a suspension of particles of high surface activity from the standpoint of reducing power.

As above intimated, the present invention is applicable to water-containing drilling muds which, in general, are typically formulated as a suspension of common clays together with specialized drilling clays such as bentonite, weighting agents such as barytes, inert metals, iron oxide, and the like, and may contain many other conventional additives. Ordinarily, the drilling fluid is rendered alkaline by the addition of caustic, sodium silicate or the like and may range from the low alkalinity muds having a pH about 7 to 9 to relatively high alkalinity muds with pH values ranging upwardly from pH 9 and frequently as high as 11.0 to 12.5. It is to the moderate and high alkalinity muds that the invention is particularly applicable due to the accelerated decomposition which the tannin dispersant tends to undergo in such media.

Advantageously the powdered zinc is employed as a protective agent in drilling fluids having a pH of about 7.0 to 12.0. On the other hand, it is preferable to use the powdered aluminum protective agent in the relatively high pH range as for example above 10.0. In general, the other powdered metals coming within the broad aspect of the present invention may generally be used at any alkaline pH, that is above 7.0.

The invention is also applicable to tannin drilling fluids containing starchy and proteinaceous materials incorporated to improve the so-called wall forming characteristics of the mud and increase resistance to loss of fluid through the so-called wall or filter cake deposited by the mud on formation surfaces along the bore hole.

Advantageously, the powdered solid particle metal protective agent may be uniformly admixed and incorporated with the tannin extract prior to mud preparation, thus avoiding separate addition to the drilling fluid. For example, a dry commercial plant tannin extract is admixed with about 1.0 to 40%, preferably about 5 to 20%, of finely divided solid particle aluminum or zinc having a mesh size of, for example, 200-325 mesh. The powdered metal may be subjected to surface amalgamation as previously described. This mixture may be supplied as such to the location where the mud is to be prepared or compounded so that when the plant tannin dispersant is incorporated in the mud in the usual manner there is a concomitant incorporation of a proper protective amount of the metal powder.

One typical example of a drilling fluid conforming to the present invention comprises the P-95 mud above mentioned, a high quality mud from Rosamond, California, to which is added about 1.8 pounds of quebracho and 0.9 pound of caustic soda per A. P. I. barrel. To this mixture is added, and carefully dispersed therein, about 0.1 pound per barrel of powdered zinc having a mesh size in the range of about 200-325 mesh. The particles remain in uniform suspension in the resulting mud and the mud, moreover, remains constantly at its compounded viscosity and filteration water loss rate as long as the metallic particles are present. In the foregoing example, aluminum powder of the same mesh size range may be substituted for the zinc powder with essentially the same results.

The present invention is also applicable to tannin containing, aqueous drilling fluids, which, in addition to, or in place of, suspended clay particles, include a dispersed oil phase composed of a suitable fraction of crude or refined oil suitably emulsified in the aqueous phase in accordance with known practice.

In general, therefore, the invention comprehends stabilizing the effective properties of plant tannin materials in any drilling fluid comprising water, particularly under conditions of substantial alkalinity.

Expressions such as "plant tannin extracts" and "plant extract materials" as used herein are intended to include quebracho extract as well as such forms as the quebracho may take in drilling of the aqueous fluids, particularly under other alkaline conditions. Since, however, the desired dispersant properties are dependent upon the tannin constituents of the extract, the foregoing terms as used herein mean also the other and equivalent plant tannin extracts and derivatives, as for example, Chestnut, Divi-Divi, Gambier, Hemlock, Quercitron, Osage, and the like, as well as tannic acid and gallic acid salts normally occurring as constituents of the drilling mud as a result of addition thereto of the plant tannin derivative.

Obviously, many modifications and variations of the above invention, as herein set forth, may be made without departing from the spirit and scope thereof, therefore, only such limitations should be imposed as are indicated in the appended claims.

We claim:

1. In the drilling of a well bore through subsurface ground formations with a rotary drill wherein an aqueous, alkaline drilling fluid is continuously circulated through the drill stem and about the bit of a rotary drilling rig, said drilling fluid containing a viscosity-controlling additive of the class consisting of the plant tannin materials, the improvement which comprises circulating as said drilling fluid an aqueous alkaline drilling fluid containing a small quantity of suspended, finely divided, solid particles of a metal having a substantial reducing power in aqueous, alkaline media and capable of reaction slowly in aqueous alkaline media to liberate hydrogen, and effective to inhibit deterioration of the said plant tannin material contained in said fluid.

2. In the drilling of a well bore through subsurface ground formations with a rotary drill wherein an aqueous, alkaline drilling fluid is continuously circulated through the drill stem and about the bit of a rotary drilling rig, said drilling fluid containing a viscosity-controlling additive of the class consisting of the plant tannin materials, the improvement which comprises circulating as said drilling fluid a suspension of finely divided, solid particle material of the class consisting of zinc, aluminum, iron, calcium, magnesium and barium and alloys thereof, effective to overcome normal deterioration of the plant tannin materials contained in said fluid.

3. The method according to claim 1 wherein said suspended metal particles are present in the drilling fluid in an amount equal to about 0.5 to 1.0 pound per barrel.

4. A composition effective as a drilling fluid modifier in boring subsurface formations by means of a rotary drill, employing a continuously circulating drilling fluid, said composition comprising a plant tannin material having associated therewith a substantial proportion of a solid particle metal powder having a substantial reducing power in aqueous, alkaline solution and capable of reacting slowly in aqueous alkaline media to liberate hydrogen.

5. A composition effective as a drilling fluid modifier in boring subsurface formations by means of a rotary drill, employing a continuously circulating drilling fluid, said composition comprising a plant tannin material having suspended therein a substantial quantity of a solid particle metal powder of the class consisting of zinc, aluminum, iron, magnesium, barium, calcium and alloys thereof, effective to overcome deterioration of said plant tannin material in the presence of an aqueous fluid.

6. An aqueous, alkaline drilling mud for drilling subsurface formations, containing a plant tannin material and having dispersed therein a substantial amount of a finely divided solid particle metal, having a substantial reducing power in the presence of said aqueous, alkaline fluid and capable of reacting slowly in aqueous alkaline media to liberate hydrogen.

7. An aqueous, alkaline drilling mud for drilling subsurface formations containing a plant tannin material and containing dispersed therein a substantial amount of a finely divided solid particle metal of the class consisting of zinc, aluminum, iron, magnesium, calcium, barium and alloys thereof, effective to overcome loss of dispersing properties of said plant tannin material in the presence of said fluid.

8. In the drilling of a well bore through subsurface ground formations with a rotary drill wherein an aqueous, alkaline drilling fluid is continuously circulated through the drill stem and about the bit of a rotary drilling rig, said drilling fluid containing a viscosity-controlling additive of the class consisting of the plant tannin materials, the improvement which comprises circulating as said drilling fluid an aqueous alkaline drilling fluid containing metallic zinc in an amount effective to inhibit normal deterioration of the plant tannin materials contained in said fluid.

9. In the drilling of a well bore through subsurface ground formations with a rotary drill wherein an aqueous, alkaline drilling fluid is continuously circulated through the drill stem and about the bit of a rotary drilling rig, said drilling fluid containing a viscosity-controlling additive of the class consisting of the plant tannin materials, the improvement which comprises circulating as said drilling fluid an aqueous alkaline drilling fluid containing metallic aluminum in an amount effective to inhibit normal deterioration of the plant tannin materials contained in said fluid.

10. In the drilling of a well bore through subsurface ground formations with a rotary drill wherein an aqueous, alkaline drilling fluid is continuously circulated through the drill stem and about the bit of a rotary drilling rig, said drilling fluid containing a viscosity-controlling additive of the class consisting of the plant tannin materials, the improvement which comprises circulating as said drilling fluid an aqueous alkaline drilling fluid containing metallic magnesium in an amount effective to inhibit normal deterioration of the plant tannin materials contained in said fluid.

11. A composition effective as a drilling fluid modifier in boring subsurface formations by means of a rotary drill, employing a continuously circulating drilling fluid, said composition comprising a plant tannin material having associated therewith a substantial proportion of a solid particle metal powder comprising aluminum in an amount effective to overcome deterioration of said plant tannin in the presence of an aqueous fluid.

12. A composition effective as a drilling fluid modifier in boring subsurface formations by means of a rotary drill, employing a continuously circulating drilling fluid, said composition comprising a plant tannin material having associated therewith a substantial proportion of a solid particle metal powder comprising zinc in an amount effective to overcome deterioration of said plant tannin in the presence of an aqueous fluid.

13. A composition effective as a drilling fluid modifier in boring subsurface formations by means of a rotary drill, employing a continuously circulating drilling fluid, said composition comprising a plant tannin material having associated therewith a substantial proportion of a solid particle metal powder comprising magnesium in an amount effective to overcome deterioration of said plant tannin in the presence of an aqueous fluid.

14. An aqueous, alkaline drilling mud for drilling subsurface formations containing a plant tannin material and containing dispersed therein a substantial amount of a finely divided solid particle powder comprising metallic aluminum in an amount effective to overcome loss of dispersing properties of said plant tannin material in the presence of said fluid.

15. An aqueous, alkaline drilling mud for drilling subsurface formations containing a plant tannin material and containing dispersed therein a substantial amount of a finely divided solid particle powder comprising metallic zinc in an amount effective to overcome loss of dispersing properties of said plant tannin material in the presence of said fluid.

16. An aqueous, alkaline drilling mud for drilling subsurface formations containing a plant tannin material and containing dispersed therein a substantial amount of a finely divided solid particle powder comprising metallic magnesium in an amount effective to overcome loss of dispersing properties of said plant tannin material in the presence of said fluid.

References Cited in the file of this patent
UNITED STATES PATENTS

| | | |
|---|---|---|
| 1,006,977 | Paessler et al. | Oct. 24, 1911 |
| 1,663,492 | Chamberlain | Mar. 20, 1928 |
| 2,560,930 | Campise et al. | July 17, 1951 |